United States Patent
Chen et al.

(10) Patent No.: US 12,005,428 B2
(45) Date of Patent: Jun. 11, 2024

(54) ISOPOLY-VANADIC ACID COORDINATION POLYMER CATALYST, METHOD OF MANUFACTURING THE SAME, AND APPLICATION THEREOF

(71) Applicant: Changzhou University, Changzhou (CN)

(72) Inventors: Qun Chen, Changzhou (CN);
Zhenxiang Xia, Changzhou (CN);
Shengchun Chen, Changzhou (CN);
Mingyang He, Changzhou (CN);
Junfeng Qian, Changzhou (CN);
Meijun Wei, Changzhou (CN)

(73) Assignee: Changzhou University, Changzhou (CN)

( * ) Notice: Subject to any disclaimer, the term of this patent is extended or adjusted under 35 U.S.C. 154(b) by 1 day.

(21) Appl. No.: 17/873,181

(22) Filed: Jul. 26, 2022

(65) Prior Publication Data

US 2023/0173468 A1    Jun. 8, 2023

(30) Foreign Application Priority Data

Dec. 3, 2021  (CN) .......................... 202111475223.X (51) Int. Cl.
*B01J 23/847*      (2006.01)
*B01J 37/04*       (2006.01)
(Continued)

(52) U.S. Cl.
CPC ........... *B01J 23/8472* (2013.01); *B01J 37/04* (2013.01); *B01J 37/08* (2013.01); *C08G 63/823* (2013.01)

(58) Field of Classification Search
CPC ........ B01J 23/8472; B01J 37/04; B01J 37/08; B01J 31/0244; B01J 31/1691; B01J 31/181; C08G 63/823
(Continued)

(56) References Cited

U.S. PATENT DOCUMENTS 4,052,988 A    10/1977  Doddi et al.
5,652,331 A     7/1997  Forschner et al.
(Continued)

FOREIGN PATENT DOCUMENTS

CN       110184463 A  *  8/2019  ........... C22B 11/021
WO         9721753 A1     6/1997
WO    WO-2016040077 A1  *  3/2016  ............ C23C 16/02

OTHER PUBLICATIONS

Fangting Liu et al., "Theoretical design and experimental study a novel direct Z-scheme V2O5/C3N5 heterojunction for efficient photocatalytic hydrogen production." Solar Energy Materials and Solar Cells 257, pp. 1-11. (Year: 2023).*
(Continued)

*Primary Examiner* — Patricia L. Hailey
(74) *Attorney, Agent, or Firm* — IDEA Intellectual Limited; Margaret A. Burke; Sam T. Yip (57) ABSTRACT

An isopoly-vanadic acid coordination polymer catalyst, method of manufacturing the same, and application thereof are provided. The isopoly-vanadic acid coordination polymer catalyst has a chemical formula of $[Co(atrz)(V_2O_6)]$. The atrz is a 4-amino-1,2,4-triazole ligand, and $[V_2O_6]$ is a binuclear vanadate anion. The isopoly-vanadic acid coordination polymer catalyst shows strong thermal stability, and it is easy to synthesize with high reproducibility. The isopoly-vanadic acid coordination polymer catalyst has a good catalytic activity towards the bulk ring-opening of p-dioxanone. The resulting poly(p-dioxanone) is stable and uniform. The high molecular weight of the resulting poly
(Continued)

(p-dioxanone) has great potential in high polymer materials, in particular the field of medical high polymer materials.

10 Claims, 3 Drawing Sheets

(51) Int. Cl.
*B01J 37/08* (2006.01)
*C08G 63/82* (2006.01)

(58) Field of Classification Search
USPC ........ 502/325, 162, 167, 353; 528/354, 357; 525/411, 415; 549/274
See application file for complete search history.

(56) References Cited

U.S. PATENT DOCUMENTS

| | | | |
|---|---|---|---|
| 5,717,059 A | 2/1998 | Forschner | |
| 2008/0311401 A1* | 12/2008 | Letard | C09K 9/02 428/404 |
| 2023/0158477 A1* | 5/2023 | He | C08G 63/823 502/325 |
| 2023/0167237 A1* | 6/2023 | He | C08G 63/08 528/277 |
| 2023/0173469 A1* | 6/2023 | Chen | B01J 31/181 502/321 |

OTHER PUBLICATIONS

Zhara Sharifzadeh et al., "Amine-Functionalized Metal-Organic Frameworks: from Synthetic Design to Scrutiny in Application." Coordination Chemistry Reviews 459, pp. 1-67. (Year: 2022).*
Fatemeh Hajizadeh et al., "Synthesis and investigation of two new crystalline organic inorganic nano-hybrids based on Wells-Dawson vanadotungstates and 1H-1,2,-4-triazole as electro- and photocatalysts." Journal of Molecular Structure 1224, pp. 1-10. (Year: 2021).*
Xiu-Li Wang et al., "Polyoxometalate-directed assembly of various multinuclear metal-organic complexes with 4-amino-1,2,4-triazole and selective photocatalysts for organic dye degradation." Crystal Engineering Communications, 17, pp. 4179-4189. (Year: 2015).*
Kricheldorf H.R., Damrau D.O. Macrol. Polylactones, 42. Zn L-lactate-catalyzed polymerizations of 1,4-dioxan-2-one, Chem. Phys. 1998, 199, 1089-1097.
Raquez J.-M., et al., Some Thermodynamic, Kinetic, and Mechanistic Aspects of the Ring-Opening Polymerization of 1,4-Dioxan-2-one Initiated by Al(OiPr)3 in Bulk, macromolecules 2001, 34, 8419-8425.
Yang K.-K., et al., AlEt3-H2O-H3PO4 catalyzed polymerizations of 1, 4-dioxan-2-one, Polymer. Bull. 2005, 54, 187-193.
Zhu X.-L., et al., Ring-opening polymerization of 1,4-dioxan-2-one initiated by lanthanum isopropoxide in bulk, Polymer. Sci. Pol. Chem. 2008, 46, 5214-5222.

* cited by examiner

ISOPOLY-VANADIC ACID COORDINATION POLYMER CATALYST, METHOD OF MANUFACTURING THE SAME, AND APPLICATION THEREOF

CROSS REFERENCE OF RELATED APPLICATION

This application is claiming priority from Chinese patent application number 202111475223.X filed on Dec. 3, 2021, the disclosures of which are incorporated herein by reference in their entirety.

FIELD OF THE INVENTION

The invention relates to the technical field of catalysts. In particular, it relates to an isopoly-vanadic acid coordination polymer catalyst, method of manufacturing the same, and application thereof.

BACKGROUND OF THE INVENTION

As an aliphatic polyester ether, poly(p-dioxanone) (PPDO) has good biocompatibility, biodegradability and bioabsorbability. PPDO is an ideal medical biodegradable material. PPDO's trade name is PDS, and it was first developed by Ethicon, a subsidiary of Johnson & Johnson, in the 1970s. PPDO is approved and certified by the US Food and Drug Administration as a medical absorbable surgical suture. In addition, PPDO is used as orthopaedic fixation material, tissue repair material, cell scaffolding, and a drug carrier. Compared with biodegradable aliphatic polyesters such as polylactic acid and polydioxane, PPDO has better monomer recyclability, which is a desirable trait for the production of disposable plastic products. PPDO offers a low-carbon-emission footprint, making it less environmentally harmful than similar materials. It can also be widely used as a degradable high polymer material in the field of biomedicine.

The structure of p-dioxanone is stable, such that when it comes to the ring-opening polymerization, it is more difficult to effect the reaction on p-dioxanone in comparison with glycolide, lactide and dioxanone. Methods to synthesize PPDO are limited, and the monomer conversion rate is low. Transesterification is likely to occur in the polymerization, and therefore the molecular weight distribution is too broad. The time for polymerization is often too long. These drawbacks limit the industrial applications of PPDO. Forschener et al. used stannous octanoate as a catalyst and dodecanol as a cocatalyst to effect ring-opening polymerization of PPDO. When the ratio of the monomer to catalyst is 10,000:1, the molecular weight of PPDO is 81,000, but its conversion rate is only 67%. (U.S. Pat. Nos. 5,652,331, 5,717,059, and WO9721753). Doddi et al. used diethylzinc, which is rather unstable, to catalyze the ring-opening polymerization of PPDO. The conditions for this polymerization were strict. After 72 hours of polymerization, the molecular weight of the product was also low. The intrinsic viscosity was 0.7 dl/g (U.S. Pat. No. 4,052,988). In 1998, Kricheldorf et al. effected ring-opening polymerization of PPDO by zinc lactate. At 100° C., when the ratio of the monomer to catalyst was 2,000:1, the viscosity of the polymer reached 0.95 dl/g after 14 days of reaction. However, the yield was only 62% (Kricheldorf H. R., Damrau D. O. *Macrol. Chem. Phys.* 1998, 199, 1089-1097). In 2001, Raquez et al. used aluminum triisopropoxide as catalyst to catalyze the ring-opening polymerization of PPDO. The highest intrinsic viscosity of the resulting PPDO was 0.77 dl/g, and the monomer conversion was 70% (Raquez J.-M., Degée P., Narayan R., Dubois P. macromolecules 2001, 34, 8419-8425). Wang Yuzhong et al. used triethyl aluminum phosphate aqueous salt system, lanthanum isopropoxide and other catalysts for ring-opening polymerization of PPDO to prepare PPDO (Yang K.-K., Guo Y.-H., Wang Y.-Z., Wang X.-L., Zhou Q. *Polymer. Bull.* 2005, 54, 187-193, and Zhu X.-L., Wu G., Qiu Z.-C., Zhou Y., Gong J., Yang K.-K., Wang Y.-Z. *J. Polymer. Sci. Pol. Chem.* 2008, 46, 5214-5222). There is a need to develop effective and stable catalysts for the ring-opening polymerization of PPDO.

SUMMARY OF THE INVENTION

This section is for the purpose of summarizing some aspects of embodiments of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems.

Accordingly, one aspect of the present invention provides an isopoly-vanadic acid coordination polymer catalyst.

In one embodiment, the isopoly-vanadic acid coordination polymer catalyst has a chemical formula of [Co(atrz)($V_2O_6$)]. The atrz is a 4-amino-1,2,4-triazole ligand, and [$V_2O_6$] is a binuclear vanadate anion.

In a further embodiment of the present invention, a second structural unit of the isopoly-vanadic acid coordination polymer catalyst is a crystal of an orthorhombic crystal system, a space group of Pnma, a molecular formula of $C_2H_4CoN_4O_6V_2$, and a molecular weight of 340.90. The isopoly-vanadic acid coordination polymer catalyst has cell parameters of a=8.8329(8)Å, b=7.6604(7)Å, c=13.5315(11) Å, $\alpha$=90°, $\beta$=90°, $\gamma$=90°, a cell volume of 915.59(14)Å$^3$, and z=4. A basic structure of the isopoly-vanadic acid coordination polymer catalyst is a three-dimensional network structure in which cobalt ions coordinate with the 4-amino-1,2,4-triazole ligands and the binuclear vanadate anion [$V_2O_6$].

Another aspect of the present invention provides a method of manufacturing an isopoly-vanadic acid coordination polymer catalyst. The method includes providing a composition including cobalt salt, ammonium metavanadate, 4-amino-1,2,4-triazole and distilled water. The composition is added to an autoclave. The autoclave is heated in a closed condition, then it is cooled to room temperature after the reaction in it has completed. The composition is centrifugally dried to obtain a dried product, which is rinsed with deionized water and ethanol. The dried product is dried to obtain the isopoly-vanadic acid coordination polymer catalyst.

In a further embodiment of the present invention, heating the autoclave in the closed condition includes a heating temperature ranging between 150 and 190° C. in an oven, and a heating time ranging between 24 and 96 hours.

In a further embodiment of the present invention, the providing the composition includes the cobalt salt being selected from the group consisted of cobalt nitrate, cobalt sulfate, cobalt chloride, or the combination thereof. A mass ratio between the ammonium metavanadate and the cobalt salt ranges between 1:1 and 1:3. A mass ratio between the 4-amino-1,2,4-triazole and the cobalt salt ranges between 1:1 and 1:5. A mass ratio between 4-amino-1,2,4-triazole and the ammonium metavanadate ranges between 1:1 and 1:3.

In a further embodiment of the present invention, providing the composition includes a molar amount to volume ratio between the 4-amino-1,2,4-triazole and water ranging between 2:25 and 2:45.

Still another aspect of the present invention provides an application of an isopoly-vanadic acid coordination polymer catalyst.

In an embodiment of the present invention, the application includes mixing and heating the isopoly-vanadic acid coordination polymer catalyst and dioxanone in a dry container.

In a further embodiment of the present invention, the mixing and heating includes a temperature ranging between 60 and 100° C. and a duration ranging between 12 and 18 hours.

In a further embodiment of the present invention, the mixing and heating the isopoly-vanadic acid coordination polymer catalyst and p-dioxanone in a dry container includes a mass ratio between the isopoly-vanadic acid coordination polymer catalyst and p-dioxane ranging between 1:2,000 and 1:8,000.

In a further embodiment of the present invention, a poly(p-dioxanone) obtained through the mixing and heating the isopoly-vanadic acid coordination polymer catalyst and dioxanone in the dry container has a weight average molecular weight ranging between 20,000 and 50,000 and a molecular weight distribution index ranging between 1.3 and 1.5.

The isopoly-vanadic acid coordination polymer catalyst of the present invention has strong thermal stability. The method of synthesis the isopoly-vanadic acid coordination polymer catalyst is simple with high reproducibility. The isopoly-vanadic acid coordination polymer catalyst has better catalytic activity towards the bulk ring-opening polymerization of p-dioxanone. After 12 to 18 hours of polymerization, the monomer conversion rate is more than 99%. The resulting poly(p-dioxanone) has a weight average molecular weight exceeding 20,000. For poly(p-dioxanone), this high molecular weight implies stability and uniformity. Such poly(p-dioxanone) has great potential as a high polymer material, in particular, in the field of medical high polymer materials.

BRIEF DESCRIPTION OF THE DRAWINGS

In order to more clearly illustrate the technical solutions of the embodiments of the present invention, the drawings that are used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Furthermore, reference herein to "one embodiment" or "an embodiment" means that a particular feature, structure, or characteristic described in connection with the embodiment is included in at least one implementation of the invention. The appearances of the phrase "in one embodiment" in various places in the specification are not necessarily all referring to the same embodiment, nor are separate or alternative embodiments mutually exclusive of other embodiments.

Example 1

Manufacturing of isopoly-vanadic acid coordination polymer catalyst: Cobalt sulfate heptahydrate (449.8 mg, 1.6 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 170° C. for 72 hours, it is cooled to room temperature to obtain dark purple block crystals with a yield of 40.8% (45.4 mg, based on 4-amino-1,2,4-triazole).

Example 2

Cobalt chloride hexahydrate (380.7 mg, 1.6 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 170° C. for 72 hours, it is cooled to room temperature to obtain dark purple block crystals with a yield of 8.3% (9.2 mg, based on 4-amino-1,2,4-triazole).

Example 3

Cobalt chloride hexahydrate (465.6 mg, 1.6 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 170° C. for 72 hours, it is cooled to room temperature to obtain dark purple block crystals with a yield of 22.7% (25.3 mg, based on 4-amino-1,2,4-triazole).

Example 4

Cobalt sulfate heptahydrate (112.4 mg, 0.4 mmol), 4-amino-1,2,4-triazole (33.6 mg, 0.4 mmol), ammonium metavanadate (139.2 mg, 1.2 mmol) and deionized water (7 ml) are added to a 15 ml polytetrafluoroethylene autoclave. After the composition undergoes a reaction at 170° C. for 72 hours, it is cooled to room temperature to obtain dark purple block crystals with a yield of 10.7% (11.9 mg, based on 4-amino-1,2,4-triazole).

Example 5

Cobalt sulfate heptahydrate (674.4 mg, 2.4 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 170° C. for 72 hours, it is cooled to room temperature to obtain dark purple block crystals with a yield of 40.8% (45.4 mg, based on 4-amino-1,2,4-triazole).

Example 6

Cobalt sulfate heptahydrate (449.8 mg, 1.6 mmol), 4-amino-1,2,4-triazole (33.6 mg, 0.4 mmol), ammonium metavanadate (46.4 mg, 0.4 mmol) and deionized water (7 ml) are added to a 15 ml polytetrafluoroethylene autoclave. After the composition undergoes a reaction at 170° C. for 72 hours, it is cooled to room temperature to obtain dark purple block crystals with a yield of 18.5% (20.6 mg, based on 4-amino-1,2,4-triazole).

Example 7

Cobalt sulfate heptahydrate (449.8 mg, 1.6 mmol), 4-amino-1,2,4-triazole (33.6 mg, 0.4 mmol), ammonium metavanadate (139.2 mg, 1.2 mmol) and deionized water (7 ml) are added to a 15 ml polytetrafluoroethylene autoclave. After the composition undergoes a reaction at 170° C. for 72 hours, it is cooled to room temperature to obtain dark purple block crystals with a yield of 40.8% (45.4 mg, based on 4-amino-1,2,4-triazole).

Example 8

Cobalt sulfate heptahydrate (449.8 mg, 1.6 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 170° C. for 72 hours, it is cooled to room temperature to obtain dark purple block crystals with a yield of 31.4% (31.9 mg, based on 4-amino-1,2,4-triazole).

Example 9

Cobalt sulfate heptahydrate (449.8 mg, 1.6 mmol), 4-amino-1,2,4-triazole (33.6 mg, 0.4 mmol), ammonium metavanadate (92.8 mg, 0.8 mmol) and deionized water (9 ml) are added to a 15 ml polytetrafluoroethylene autoclave. After the composition undergoes a reaction at 170° C. for 72 hours, it is cooled to room temperature to obtain dark purple block crystals with a yield of 20.3% (22.6 mg, based on 4-amino-1,2,4-triazole).

Example 10

Manufacturing of isopoly-vanadic acid coordination polymer catalyst: Cobalt sulfate heptahydrate (449.8 mg, 1.6 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 150° C. for 72 hours, it is cooled to room temperature to obtain dark purple block crystals with a yield of 15.2% (16.9 mg, based on 4-amino-1,2,4-triazole).

Example 11

Manufacturing of isopoly-vanadic acid coordination polymer catalyst: Cobalt sulfate heptahydrate (449.8 mg, 1.6 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 190° C. for 72 hours, it is cooled to room temperature to obtain dark purple block crystals with a yield of 20.4% (22.7 mg, based on 4-amino-1,2,4-triazole).

Example 12

Manufacturing of isopoly-vanadic acid coordination polymer catalyst: Cobalt sulfate heptahydrate (449.8 mg, 1.6 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 170° C. for 24 hours, it is cooled to room temperature to obtain dark purple block crystals with a yield of 10.2% (45.4 mg, based on 4-amino-1,2,4-triazole).

Example 13

Manufacturing of isopoly-vanadic acid coordination polymer catalyst: Cobalt sulfate heptahydrate (449.8 mg, 1.6 mmol), 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes a reaction at 170° C. for 96 hours, it is cooled to room temperature to obtain dark purple block crystals with a yield of 40.8% (45.4 mg, based on 4-amino-1,2,4-triazole).

Comparative Example 1

Cobalt sulfate heptahydrate is replaced with cobalt acetate or other metal salts (such as iron nitrate, cobalt nitrate, magnesium nitrate, calcium nitrate, silver nitrate or aluminum nitrate, 1.6 mmol). The other metal salts, 4-amino-1,2,4-triazole (33.6 mg, 0.4 mmol), ammonium metavanadate (92.8 mg, 0.8 mmol) and deionized water (7 ml) are added to a 15 ml polytetrafluoroethylene autoclave. After the composition undergoes reacting at 170° C. for 72 hours, it is cooled to room temperature. The product is purple amorphous powder with undefined structure. No crystal sample suitable for X-ray single crystal diffraction analysis is obtained.

Comparative Example 2

Ammonium metavanadate is replaced with other metavanadate salts (such as sodium metavanadate or potassium metavanadate, 0.8 mmol). The other metavanadate salts, cobalt sulfate heptahydrate (449.8 mg, 1.6 mmol), 4-amino-1,2,4-triazole (33.6 mg, 0.4 mmol) and deionized water (7 ml) are added into a 15 ml polytetrafluoroethylene autoclave. After the composition undergoes a reacting at 170° C. for 72 hours, it is cooled to room temperature. The product is grayish brown amorphous powder with undefined structure. No crystal sample suitable for X-ray single crystal diffraction analysis is obtained.

Comparative Example 3

4-amino-1,2,4-triazole is replaced with other triazole ligands (such as 1,2,4-triazole, 1-methyl-1,2,4-triazole, 4-methyl-1,2,4-triazole, 0.4 mmol). The other triazole ligands, cobalt sulfate heptahydrate (449.8 mg, 1.6 mmol), ammonium metavanadate (92.8 mg, 0.8 mmol) and deionized water (7 ml) are added to a 15 ml polytetrafluoroethylene autoclave. After the composition undergoes a reaction at 170° C. for 72 hours, it is cooled to room temperature. The product is grayish brown amorphous powder with undefined structure. No crystal sample suitable for X-ray single crystal diffraction analysis is obtained.

Example 14

The dark purple block crystals obtained in Example 1 is characterized as follows. The crystal structure is determined by Bruker Apex II CCD diffractometer with graphite monochromated Mo Kα ray (λ=0.71073 Å) at 293(2)K by ω scanning to collect the diffraction points. The collected data were restored by a SAINT program and semi empirical absorption correction is performed by SADABS method. The structure analysis and refinement are completed by SHELLXS and SHELLXL of SHELLXTL program respectively. $F^2$ is modified by a full matrix least square method to obtain the coordinates and anisotropy parameters of all non-hydrogen atoms.

Figure 1:
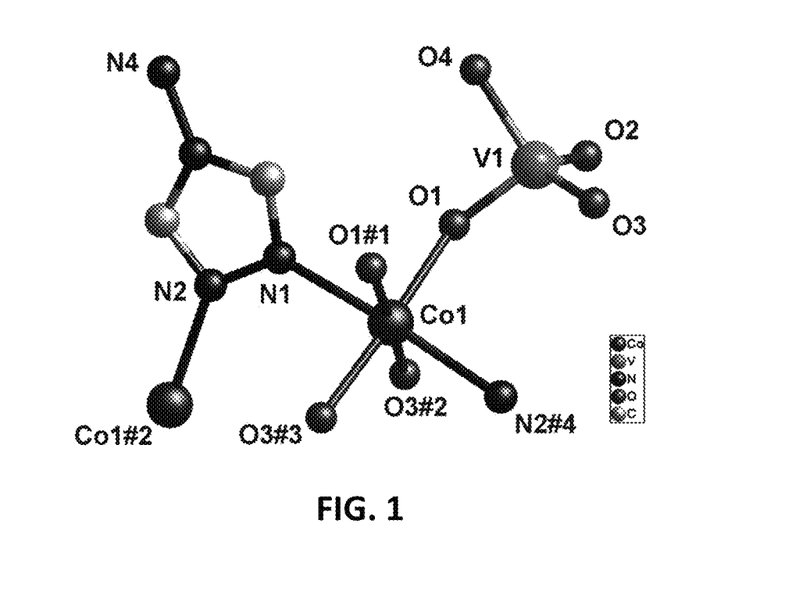
FIG. 1 is a schematic diagram showing an isopoly-vanadic acid coordination polymer catalyst according to an embodiment of the present invention.
Figure 2:
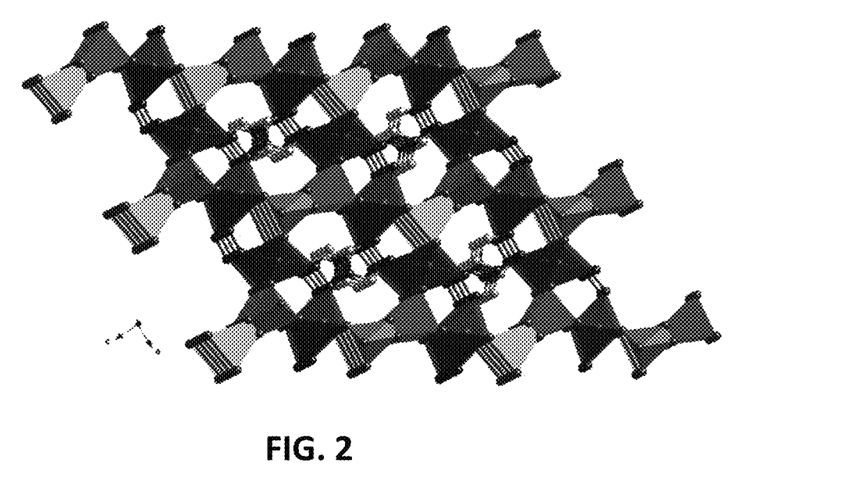
FIG. 2 is a schematic three-dimensional network structure diagram showing an isopoly-vanadic acid coordination polymer catalyst of Example 1 according to an embodiment of the present invention.

FIG. 1 shows the coordination environment of the cobalt ions. FIG. 2 shows the three-dimensional network structure. According to FIGS. 1 and 2, all hydrogen atoms are theoretically fixed to the parent atom in the process of structural refinement, and the isotropic displacement parameter is slightly larger than the parent atom displacement parameter (C—H, 1.2 or N—H, 1.2 times). Table 1 shows the detailed crystal measurement data.

Example 15

The product yield of the dark purple block crystals manufactured in Examples 1 to 13 are calculated. The method of calculation of the yield is as follows:

$$\text{yield (\%)} = \frac{\text{Measured product weight}}{\text{Product weight calculated based on 4-amino-1,2,4-triazole}}$$

The calculated results are recorded in Table 1.

TABLE 1

Yield of dark purple block crystals manufactured in Examples 1 to 13

| Example | Yield (%) | Product Weight (mg) |
| --- | --- | --- |
| Example 1 | 40.8 | 45.4 |
| Example 2 | 8.3 | 9.2 |
| Example 3 | 22.7 | 25.3 |
| Example 4 | 10.7 | 11.9 |

TABLE 1-continued

Yield of dark purple block crystals manufactured in Examples 1 to 13

| Example | Yield (%) | Product Weight (mg) |
| --- | --- | --- |
| Example 5 | 40.8 | 45.4 |
| Example 6 | 18.5 | 20.6 |
| Example 7 | 40.8 | 45.4 |
| Example 8 | 31.4 | 31.9 |
| Example 9 | 20.3 | 22.6 |
| Example 10 | 15.2 | 16.9 |
| Example 11 | 20.4 | 22.7 |
| Example 12 | 10.2 | 11.4 |
| Example 13 | 40.8 | 45.4 |

The data in Table 1 show that the yields in Example 1, Example 5 and Example 13 are the highest. However, in Example 5 and Example 13, the drawbacks are the excessive amount of material used and longer reaction time under the predetermined temperature. The preferred embodiment for the parameters and material ratio is shown in Example 1.

Example 16

Measurement of Crystal Structure of Isopoly-Vanadic Acid Coordination Polymer Catalyst The crystal structure is determined by Bruker Apex II CCD diffractometer with graphite monochromated Mo Kα ray (λ=0.71073 Å) at 293(2)K by ω scanning to collect the diffraction points. The collected data were restored by a SAINT program and semi empirical absorption correction is performed by SADABS method. The structure analysis and refinement are completed by SHELLXS and SHELLXL of SHELLXTL program respectively. $F^2$ is modified by a full matrix least square method to obtain the coordinates and anisotropy parameters of all non-hydrogen atoms. All hydrogen atoms are theoretically fixed to the parent atom in the process of structural refinement, and the isotropic displacement parameter is slightly larger than the parent atom displacement parameter (C—H, 1.2 or N—H, 1.2 times). Table 2 shows the detail data of crystal measurement. FIG. 1 shows the coordination environment of the cobalt ions. FIG. 2 shows the three-dimensional network structure.

TABLE 2

Key crystallographic data of cobalt containing isopoly-vanadic acid coordination polymer catalyst

| | |
| --- | --- |
| Molecular formula | $C_2H_4CoN_4O_6V_2$ |
| Molecular weight | 340.90 |
| Crystal size | 0.40 mm × 0.35 mm × 0.23 mm |
| Crystallographic system | Orthogonal |
| Space group | Pnma |
| Cell parameters | a = 8.8329(8) Å |
| | b = 7.6604(7) Å |
| | c = 13.5315(11) Å |
| | α = 90° |
| | β = 90° |
| | γ = 90° |
| Volume | 915.59(14) Å$^3$ |
| Number of repeating units in cell | 4 |
| Density (calculated) | 2.473 mg m$^{-3}$ |
| Absorption coefficient | 3.805 |
| Absorption correction | Semi-empirical |
| Refinement | Least square |
| $F^2$ base fit | 1.129 |
| Final R factor [I > 2 s(I)] | $R_1$ = 0.0496 |
| R factor (all data) | $R_1$ = 0.0536 |
| Residual error | 0.712 eÅ$^{-3}$, −0.684 eÅ$^{-3}$ |

Example 17

Figure 3:
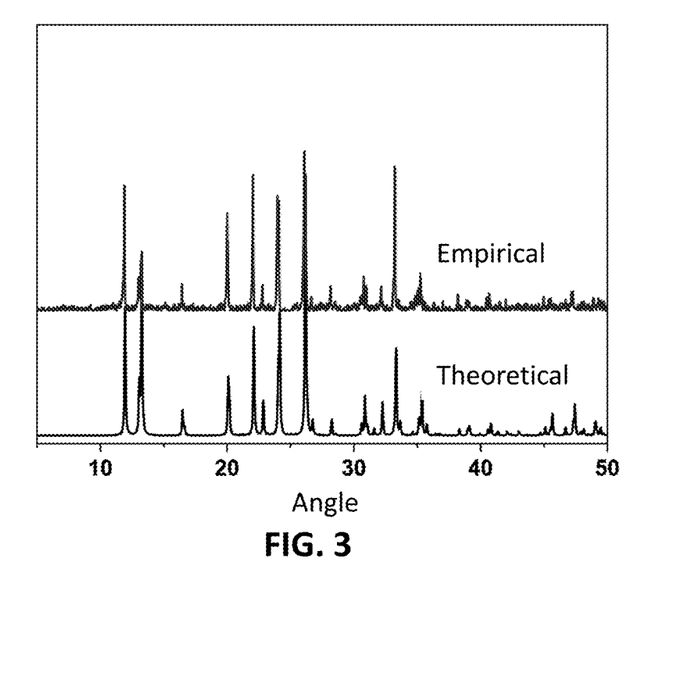
FIG. 3 is a powder diffraction diagram of an isopoly-vanadic acid coordination polymer catalyst of Example 1 according to an embodiment of the present invention.

A RigakuD/Max-2500 instrument is used to characterize the phase purity of the product obtained in Example 1. As shown in FIG. 3, the powder diffraction diagram of the cobalt containing isopoly-vanadic acid coordination polymer shows that it has a reliable phase purity, which ensures its catalytic activity in the ring-opening polymerization of dioxane.

Example 18

Figure 4:
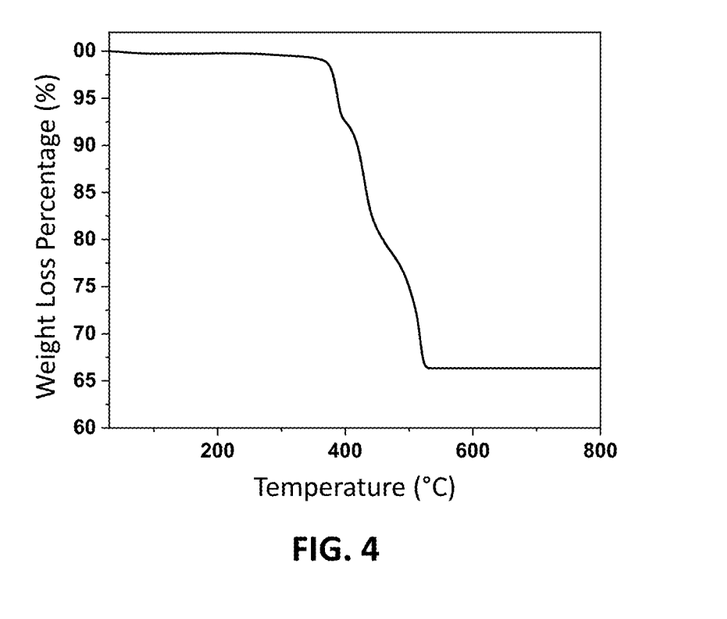
FIG. 4 is a thermogravimetric graph of an isopoly-vanadic acid coordination polymer catalyst of Example 1 according to an embodiment of the present invention.

The thermal stability of the product obtained in Example 1 is characterized by an NETZSCH/TG 209 F3. The results are shown in FIG. 4. As shown in FIG. 4, the isopoly-vanadic acid coordination polymer has high thermal stability even up to 370° C.

Example 19

This example uses the isopoly-vanadic acid coordination polymer manufactured in Example 1.

P-dioxanone (5000 mg, 49.0 mmol) and the isopoly-vanadic acid coordination polymer (3.33 mg, 0.0098 mmol) are added to a Schlenk reaction tube and kept at 80° C. for 15 hours. After the polymerization reaction is completed, it is cooled to room temperature. The product is dissolved in 25 ml of a mixed solvent of phenol and 1,1,2,2-tetrachloroethane (the weight ratio of phenol and 1,1,2,2-tetrachloroethane is 2:3). The isopoly-vanadic acid coordination polymer is recovered by centrifugation. Then, 150 ml of methanol is added to the filtrate to precipitate the polymer. The polymer is dried in a vacuum at 45° C. to obtain the white PPDO product.

Example 20

This example uses the isopoly-vanadic acid coordination polymer manufactured in Example 1.

The dark purple block crystals manufactured in Example 1 (i.e. the isopoly-vanadic acid coordination polymer) is used to catalyze the ring-opening polymerization of p-dioxanone.

P-dioxanone (5000 mg, 49.0 mmol) and the isopoly-vanadic acid coordination polymer (3.33 mg, 0.0098 mmol) are added to a Schlenk reaction tube and kept at 80° C. for 15 hours. After the polymerization reaction is completed, it is cooled to room temperature. The product is dissolved in 25 ml of a mixed solvent of phenol and 1,1,2,2-tetrachloroethane (the weight ratio of phenol and 1,1,2,2-tetrachloroethane is 2:3). The isopoly-vanadic acid coordination polymer is recovered by centrifugation. Then, 150 ml of methanol is added to the filtrate to precipitate the polymer. The polymer is dried in a vacuum at 45° C. to obtain the white PPDO product.

Example 21

This example uses the isopoly-vanadic acid coordination polymer manufactured in Example 1.

P-dioxanone (5000 mg, 49.0 mmol) and the isopoly-vanadic acid coordination polymer (8.32 mg, 0.0245 mmol) are added to a Schlenk reaction tube and kept at 80° C. for 15 hours. After the polymerization reaction is completed, it is cooled to room temperature. The product is dissolved in 25 ml of a mixed solvent of phenol and 1,1,2,2-tetrachloroethane (the weight ratio of phenol and 1,1,2,2-tetrachloroethane is 2:3). The isopoly-vanadic acid coordination polymer is recovered by centrifugation. Then, 150 ml of methanol is added to the filtrate to precipitate the polymer. The polymer is dried in a vacuum at 45° C. to obtain the white PPDO product.

Example 22

This example uses the isopoly-vanadic acid coordination polymer manufactured in Example 1.

P-dioxanone (5000 mg, 49.0 mmol) and the isopoly-vanadic acid coordination polymer (2.08 mg, 0.0061 mmol) are added to a Schlenk reaction tube and kept at 80° C. for 15 hours. After the polymerization reaction is completed, it is cooled to room temperature. The product is dissolved in 25 ml of a mixed solvent of phenol and 1,1,2,2-tetrachloroethane (the weight ratio of phenol and 1,1,2,2-tetrachloroethane is 2:3). The isopoly-vanadic acid coordination polymer is recovered by centrifugation. Then, 150 ml of methanol is added to the filtrate to precipitate the polymer. The polymer is dried in a vacuum at 45° C. to obtain the white PPDO product.

Example 23

This example uses the isopoly-vanadic acid coordination polymer manufactured in Example 1.

P-dioxanone (5000 mg, 49.0 mmol) and the isopoly-vanadic acid coordination polymer (3.33 mg, 0.0098 mmol) are added to a Schlenk reaction tube and kept at 60° C. for 15 hours. After the polymerization reaction is completed, it is cooled to room temperature. The product is dissolved in 25 ml of a mixed solvent of phenol and 1,1,2,2-tetrachloroethane (the weight ratio of phenol and 1,1,2,2-tetrachloroethane is 2:3). The isopoly-vanadic acid coordination polymer is recovered by centrifugation. Then, 150 ml of methanol is added to the filtrate to precipitate the polymer. The polymer is dried in a vacuum at 45° C. to obtain the white PPDO product.

Example 24

This example uses the isopoly-vanadic acid coordination polymer manufactured in Example 1.

P-dioxanone (5000 mg, 49.0 mmol) and the isopoly-vanadic acid coordination polymer (3.33 mg, 0.0098 mmol) are added to a Schlenk reaction tube and kept at 100° C. for 15 hours. After the polymerization reaction is completed, it is cooled to room temperature. The product is dissolved in 25 ml of a mixed solvent of phenol and 1,1,2,2-tetrachloroethane (the weight ratio of phenol and 1,1,2,2-tetrachloroethane is 2:3). The isopoly-vanadic acid coordination polymer is recovered by centrifugation. Then, 150 ml of methanol is added to the filtrate to precipitate the polymer. The polymer is dried in a vacuum at 45° C. to obtain the white PPDO product.

Example 25

This example uses the isopoly-vanadic acid coordination polymer manufactured in Example 1.

P-dioxanone (5000 mg, 49.0 mmol) and the isopoly-vanadic acid coordination polymer (3.33 mg, 0.0098 mmol) are added to a Schlenk reaction tube and kept at 80° C. for 12 hours. After the polymerization reaction is completed, it is cooled to room temperature. The product is dissolved in 25 ml of a mixed solvent of phenol and 1,1,2,2-tetrachloroethane (the weight ratio of phenol and 1,1,2,2-tetrachloroethane is 2:3). The isopoly-vanadic acid coordination polymer is recovered by centrifugation. Then, 150 ml of methanol is added to the filtrate to precipitate the polymer. The polymer is dried in a vacuum at 45° C. to obtain the white PPDO product.

Example 26

This example uses the isopoly-vanadic acid coordination polymer manufactured in Example 1.

P-dioxanone (5000 mg, 49.0 mmol) and the isopoly-vanadic acid coordination polymer (3.33 mg, 0.0098 mmol) are added to a Schlenk reaction tube and kept at 80° C. for 18 hours. After the polymerization reaction is completed, it is cooled to room temperature. The product is dissolved in 25 ml of a mixed solvent of phenol and 1,1,2,2-tetrachloroethane (the weight ratio of phenol and 1,1,2,2-tetrachloroethane is 2:3). The isopoly-vanadic acid coordination polymer is recovered by centrifugation. Then, 150 ml of methanol is added to the filtrate to precipitate the polymer. The polymer is dried in a vacuum at 45° C. to obtain the white PPDO product.

Example 27

The PPDO manufactured in Example 19 is quantitatively analyzed and measured. The relationship between the conversion rate and reaction time of p-dioxanone is measured by $^1$H NMR quantitative analysis. The results are shown in FIG. 5.

Figure 5:
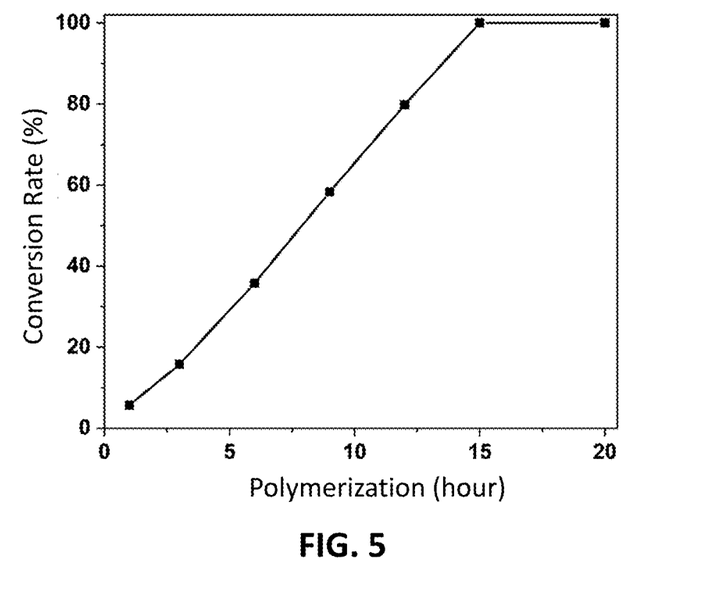
FIG. 5 is a graph showing the conversion rate and polymerization time of ring-opening polymerization of p-dioxanone catalyzed by an isopoly-vanadic acid coordination polymer catalyst of Example 1 according to an embodiment of the present invention.

As shown in FIG. 5, as the reaction time increases, the conversion rate also increases at first, then it remains the same.

Example 28

The molecular weight of the PPDO obtained in Examples 20 to 26 is determined. The method is as follows: 7.0 mg of PPDO is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). Test conditions: The column temperature is 40° C. The eluent is tetrahydrofuran. The flow rate is 0.6 ml/min. The detector is a RID-10A detector. Calibration: four different standardized polystyrene having molecular weight between ranging between 8,000, 20,000, 50,000, and 100,000 are used. The results are recorded in Table 3.

TABLE 3

Molecular weight and molecular weight distribution index of PPDO obtained in Examples 20 to 26

| Example | Molecular weight | Molecular weight distribution index |
|---|---|---|
| Example 20 | 24190 | 1.37 |
| Example 21 | 20287 | 1.39 |
| Example 22 | 47651 | 1.47 |
| Example 23 | 20180 | 1.42 |
| Example 24 | 34170 | 1.49 |
| Example 25 | 22390 | 1.40 |
| Example 26 | 24280 | 1.37 |

As shown in Table 3, the molecular weight and molecular weight distribution index of PPDO obtained in Examples 20-26 suggest that it is difficult to obtain higher molecular weight and molecular weight distribution index at the same time. In the present invention, this can be achieved by adjusting the ratio between the components and the parameters in the manufacturing process to derive the optimized molecular weight and molecular weight distribution index. In other words, more desirable molecular weight and molecular weight index can be achieved at the same time.

Comparative Example 4

P-dioxanone (5000 mg, 49.0 mmol) and cobalt sulfate heptahydrate (2.75 mg, 0.0098 mmol) are added to a Schlenk reaction tube and react at 80° C. for 15 hours to produce poly(p-dioxanone). The conversion rate of p-dioxanone is determined by $^1$H NMR quantitative analysis. The calculated conversion rate of p-dioxanone is 23.7%.

7.0 mg of PPDO is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is 9,056, and the molecular weight distribution index is 1.84.

Comparative Example 5

P-dioxanone (5000 mg, 49.0 mmol) and 4-amino-1,2,4-triazole (0.82 mg, 0.0098 mmol) are added to a Schlenk reaction tube and react at 80° C. for 15 hours. After the reaction is completed, $^1$H NMR quantitative analysis shows that p-dioxanone is not converted, and no PPDO is obtained.

Comparative Example 6

P-dioxanone (5000 mg, 49.0 mmol) and ammonium metavanadate (1.14 mg, 0.0098 mmol) are added into a Schlenk reaction tube and react at 80° C. for 15 hours. After the reaction is completed, $^1$H NMR quantitative analysis shows that p-dioxanone is not converted, and no PPDO is obtained.

It should be noted that the above-mentioned embodiments are only for illustrating the technical solutions of the present invention and not for limiting, and although the present invention has been described in detail with reference to the further embodiments, it should be understood by those skilled in the art that modifications or equivalent substitutions may be made on the technical solutions of the present invention without departing from the spirit and scope of the technical solutions of the present invention, which should be covered by the claims of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical

The invention claimed is:

1. An isopoly-vanadic acid coordination polymer catalyst, having a chemical formula of [Co(atrz)(V$_2$O$_6$)], wherein atrz is a 4-amino-1,2,4-triazole ligand, and [V$_2$O$_6$] is a binuclear vanadate anion.

2. The isopoly-vanadic acid coordination polymer catalyst of claim 1, wherein a second structural unit of the isopoly-vanadic acid coordination polymer catalyst is a crystal of an orthorhombic crystal system, a space group of Pnma, a molecular formula of C$_2$H$_4$CoN$_4$O$_6$V$_2$, and a molecular weight of 340.90, the isopoly-vanadic acid coordination polymer catalyst has cell parameters of a=8.8329(8)Å, b=7.6604(7)Å, c=13.5315(11)Å, α=90°, β=90°, γ=90°, a cell volume of 915.59(14)Å$^3$, and z=4, a basic structure of the isopoly-vanadic acid coordination polymer catalyst is a three-dimensional network structure in which cobalt ions coordinate with the 4-amino-1,2,4-triazole ligands and the binuclear vanadate anion [V$_2$O$_6$].

3. A method of manufacturing an isopoly-vanadic acid coordination polymer catalyst comprising:
   providing a composition including cobalt salt, ammonium metavanadate, 4-amino-1,2,4-triazole and distilled water;
   adding the composition into an autoclave;
   heating the autoclave in a closed condition;
   cooling the autoclave to a room temperature after a reaction being completed in the autoclave;
   centrifugal drying the composition to obtain a dried product;
   rinsing the dried product with deionized water and ethanol; and
   drying the dried product to obtain the isopoly-vanadic acid coordination polymer catalyst.

4. The method of claim 3, wherein in the heating the autoclave in the closed condition includes a heating temperature ranging between 150 and 190° C. in an oven, and a heating ranging between 24 and 96 hours.

5. The method of claim 3, wherein the providing the composition includes the cobalt salt being selected from the group consisted of cobalt nitrate, cobalt sulfate, cobalt chloride, or the combination thereof, a mass ratio between the ammonium metavanadate and the cobalt salt ranging between 1:1 and 1:3, a mass ratio between the 4-amino-1,2,4-triazole and the cobalt salt ranging between 1:1 and 1:5, and a mass ratio between 4-amino-1,2,4-triazole and the ammonium metavanadate ranging between 1:1 and 1:3.

6. The method of claim 3, wherein the providing the composition includes a molar amount to volume ratio between the 4-amino-1,2,4-triazole and water ranging between 2:25 and 2:45.

7. An application of an isopoly-vanadic acid coordination polymer catalyst comprising:
   mixing and heating the isopoly-vanadic acid coordination polymer catalyst and p-dioxanone in a dry container.

8. The application of claim 7, wherein the mixing and heating includes a temperature ranging between 60 and 100° C. and a duration ranging between 12 and 18 hours.

9. The application of claim 7, wherein the mixing and heating the isopoly-vanadic acid coordination polymer catalyst and p-dioxanone in a dry container includes a mass ratio between the isopoly-vanadic acid coordination polymer catalyst and p-dioxanone ranging between 1:2000 and 1:8000.

10. The application of claim 7, wherein a poly(p-dioxanone) obtained through the mixing and heating the isopoly-vanadic acid coordination polymer catalyst and p-dioxanone in the dry container has a weight average molecular weight ranging between 20,000 and 50,000 and a molecular weight distribution index ranging between 1.3 and 1.5.

* * * * *